United States Patent

[11] 3,594,793

| [72] | Inventor | John L. Aker<br>Olathe, Kans. |
|---|---|---|
| [21] | Appl. No. | 751,677 |
| [22] | Filed | July 25, 1968 |
| [45] | Patented | July 20, 1971 |
| [73] | Assignee | King Radio Corporation, Inc.<br>Olathe, Kans.<br>Continuation of application Ser. No.<br>636,297, May 5, 1967, now abandoned. |

[54] METHOD AND APPARATUS FOR DETERMINING THE RATE OF CHANGE OF A TIME INTERVAL
19 Claims, 4 Drawing Figs.

[52] U.S. Cl. .................................................. 343/7.3,
343/8, 343/9, 324/68, 324/82
[51] Int. Cl. ........................................................ G01s 9/44
[50] Field of Search ............................................ 343/7.3, 8,
9; 324/68, 82

[56] References Cited
UNITED STATES PATENTS

| 3,197,769 | 7/1965 | Roth ............................ | 343/6.5 |
| 3,375,517 | 3/1968 | Rodgers et al. ................ | 343/8 |

Primary Examiner—Richard A. Farley
Assistant Examiner—T. H. Tubbesing

ABSTRACT: A ground or relative speed indicator circuit that detects the rate of change of the duration of a pulse or voltage block whose duration is representative of the distance from an airborne receiver to a ground transmitter. The circuit develops a low frequency signal from the detected rate of change. The frequency of this signal is a direct function of the speed of the airborne receiver relative to the ground transmitter and is therefore measured and displayed to indicate same. The invention is further characterized by the method and associated steps for accomplishing the above.

INVENTOR
John L. Aker

METHOD AND APPARATUS FOR DETERMINING THE RATE OF CHANGE OF A TIME INTERVAL

This is a continuation of application Ser. No. 636,297 filed May 5, 1967, now abandoned.

BRIEF SUMMARY AND BACKGROUND OF THE INVENTION

A rather complete background of distance measuring equipment may be found in my patent application "Method and Apparatus for Digitally Measuring Distance," Ser. No. 574,701, filed Aug. 24, 1966, now U.S. Pat. No. 3,412,400. It is a conventional practice in distance/ground speed measuring equipment to have an airborne transmitter repeatedly send out very short, widely spaced "interrogation" pulses. These interrogation pulses are picked up by a ground beacon receiver, whose output triggers an associated transmitter into sending out relay pulses to the airborne receiver. Timing circuits automatically measure the round trip travel time or interval between interrogation and reply pulse and convert this time into electrical signals for operation of the distance indicator. Thusly, an important part of practically all of the distance measuring equipment known today includes the transmission of an interrogation pulse and a reception of the reply by the airborne unit. The measurement of the duration of the time interval between transmission of the interrogation pulse and the reception of the received beacon transmitted pulse has been found to be a useful tool in the calculation of relative ground speed. It is also contemplated that relative air to air speeds may be indicated and displayed with my inventions.

The invention includes the serial arrangement of a phase coherent gated oscillator, a sampling gate, a squaring amplifier, a monostable, a low pass filter, a follower amplifier and a speed meter. A sampling monostable is connected directly with the sampling gate for controlling the operation thereof. The phase coherent gated oscillator and the sampling monostable essentially have a common input.

The start of the time interval, e.g. that is, the leading edge of the transmitted pulse is used to gate on the phase coherent gated oscillator and to produce a running oscillatory output therefrom. This output is applied to the sampling gate, however, same has not been activated to permit passing the oscillatory signal through to the squaring amplifier. When the end of the time interval occurs, e.g. represented by the trailing edge of the received pulse, the sampling monostable will be triggered to change states and will effectively bias the sampling gate for conduction. The sampling gate will now connect to the oscillatory output of the phase coherent gated oscillator to the squaring amplifier and thence to the remainder of the serially connected circuit.

As the duration of the time interval varies with the distance that the airborne receiver is away from the ground transmitter, the sampling gate will deliver various voltage levels or phase sampled points to the squaring amplifier. This amplifier is of the type that will switch its output level in a hysteretic manner when preselected input voltages are applied thereto.

Consider the example of an aircraft approaching the ground station. It will inherently follow that the time interval will be slowly decreasing. Each successive sample of the time interval results in a slightly different sampled phase the gated oscillatory output. This changing voltage is applied to the input of the squaring amplifier causing it to switch its output state in a hysteretic manner when critical input voltages are reached. Thus, if the squaring amplifier had two trigger levels, one at +2 volts and the other at −2 volts, the output of the amplifier would be a square wave whose frequency would be dependent on the rate of change of sampled phase that is applied to the input thereof. For example, if the gated oscillatory output is running at a frequency of 1 megacycle per second ($1 \times 10^6$ cycles/second) and if the measured time interval is changing in duration at the rate of 2 microseconds per second ($2 \times 10^{16}$ second/second), then the output from the squaring amplifier is essentially the above-mentioned square wave having a frequency of 2 cycles per second $$\left( \frac{1 \times 10^6 \text{ cycles}}{\text{seconds}} \times \frac{2 \times 10^{-6} \text{ seconds}}{\text{seconds}} = \frac{2 \text{ cycles}}{\text{second}} \right).$$

A measurement of the frequency of the low frequency square wave will accordingly be a determination of the rate of change of the time interval. This rate of change factor is then interpolated into ground speed through the series connected monostable, low-pass filter, follower amplifier and speed meter mentioned above.

The above speed measurement method and circuitry is to be contrasted with the conventional analog system wherein a number of negative factors play a major role. Prior art ground speed indicators are operable as such by detecting and indicating the rate of change of a DC voltage which represents the range voltage. The rate change indicating function is specifically performed by differentiating the range voltage, through a capacitor. This range voltage might typically be from 0 to 100 volts which will be required to drive an associated range meter which would correspondingly register 0 to 100 nautical miles. The speed voltage would then be the rate of change of the range voltage with respect to time. For a value of 200 knots, this would typically be represented by 200 volts per hour or 1/180 volts per second. The current produced by such a rate of change would be quite small in magnitude (typically in the submicroampere region) and pose a number of problems in the measurement of same.

An accurate system usually requires a DC amplifier to amplify these very small currents and it must do so in the presence of range jitter which has a very large rate of change as compared to the actual rate of change due to velocity. My invention has eliminated the need for measuring a submicroampere (minimicroampere) signal in addition to eliminating the measurement of same in the presence of extremely large noise factors.

It is therefore a primary object of the invention to provide a unique method and apparatus for measuring and indicating ground speed and in which the following negative features inherent in many prior analog speed measuring systems are overcome:

1. Differentiating a representative DC range voltage through a capacitor to derive a rate of change is eliminated. As a result, expensive and sophisticated equipment for measurement in the submicroampere region is no longer necessary. This includes noise filtering schemes and equipment which were needed to preclude range jitter obscuring the extremely small current values.
2. The system accuracy of the speed circuit is not dependent on the calibration of the range circuit. Prior art systems required that the range scale factor in volts per nautical mile must be linear and accurately assigned. Calibration accuracy in the present invention merely involves applying a filtered DC voltage to a conventional speed meter (volt meter) and largely relies, for basic accuracy, on the stability of the gated oscillator. Since the oscillator may be made to be extremely stable, the accuracy of the measured quantity is considerably enhanced.
3. In general, a prior art DME searches at a more rapid rate than it tracks. During the search mode of operation, in conventional systems, the capacitor used for rate of change differentiation must be allowed to dissipate any surge left thereon. As a result, a system settling time must be allotted for. My invention obviates the need for similar capacitor differentiation and therefore settling times are greatly reduced.
4. Conventional speed circuits must have absolute value or squaring circuits as an outbound rate of change will produce a positive current and an inbound rate of change will produce a negative current. Unless absolute value circuitry were used, a speed meter having both an inbound and an outbound scale with a zero center must be used. Such scales are sometimes confusing and hard to read and in an industry where simplicity and safety are constant goals, these meters often compound difficulty. Absolute value circuitry are costly and add additional inaccuracies to an already inaccurate system. The instant invention requires neither a zero center meter nor an absolute value circuit as the rate of change of the time interval (range block) is the only factor measured herein and this rate of change is without direction and not concerned whether it is an inbound signal or an outbound signal.

Another object of the invention is to provide an inexpensive, compact, lightweight and rugged method and apparatus for measuring ground speed. A highly important feature of the invention is the increased accuracy and reliability of the displayed speed.

A further object of the invention is to effectively separate the functional operation of the speed circuit and the range or distance measuring circuit. As a result, noise and other inaccuracies which may be present in the range or distance circuit are not introduced into the speed circuit, or vice versa, and to a large extent each may operate independently of the other.

Other and further objects of the invention, together with the features of novelty appurtenant thereto, will appear in the course of the following description.

DETAILED DESCRIPTION OF THE DRAWINGS

In the accompanying drawings, which form a part of the specification and are to be read in conjunction therewith, embodiments of the invention are shown, and in the various views, like reference numerals are employed to indicate like parts.

Figure 1:
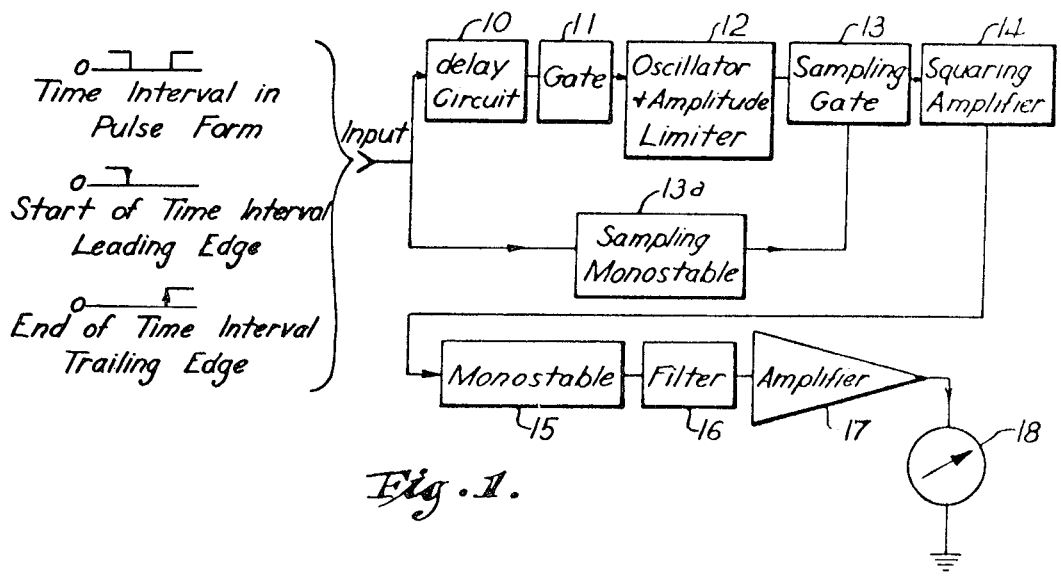
FIG. 1 is a block diagram of the ground speed measuring and indicating circuit.

Referring in more detail to FIG. 1, the range block or time interval is represented by the square wave pulse shown at the input to the block diagram. As mentioned supra, this pulse is an electrical representation of the round trip travel time or interval between an interrogation and a received reply in conventional DME systems and in the DME system disclosed in my application mentioned supra. As seen in FIG. 1, the duration of the pulse is defined between the leading edge and the trailing edge of same. This pulse falls sharply from a positive value to zero or ground potential and returns to the positive value of its origination when the time interval has ended. It is understood that the duration will change as the airborne transmitter/receiver changes in its relative distance either to or from the ground beacon receiver/transmitter.

The variable time interval, hereinafter referred to as the range block, is initially applied to a delay circuit 10. As will be explained in detail in connection with FIG. 4, the net effect of this delay circuit is to introduce a short delay in the controlling of gate 11 and its operative effect upon phase coherent oscillator 12. Essentially, gate 11 operates in such a manner that when it is off, oscillator 12 will be energized to produce an oscillatory output therefrom, and when gate 11 is on, oscillator 12 will cease to operate. The negative going leading edge of the range block is not delayed through the delay circuit and gate 11 will be turned off by the presence of same. The trailing or positive going edge of the range block will be slightly delayed through delay circuit 10 before gate 11 will be turned back on and thusly turn oscillator 12 off. The net effect here then being to eliminate distortion of the oscillator wave form by gate 11 at sampling instant.

At this point it should be noted that the output of oscillator 12 is directly connected in a serial manner with sampling gate 13 which will either pass or reject oscillatory voltage levels onto a squaring amplifier 14 depending upon whether sampling gate 13 is on or off.

A high speed sampling monostable 13a is connected to the input of the speed circuit and has its output connected in biasing relationship to sampling gate 13. The parameters of the monostable are so selected that the positive going trailing edge of the range block will trigger the sampling monostable for a short duration and turn on sampling gate 13 for this period of time. With sampling gate 13 on, the voltage level of the oscillator output at the instant of time coincident with the occurrence of the trailing edge of the range block pulse will therefore be passed to squaring amplifier 14. Since the oscillator output is sinusoidal, the sampled voltage level correlates to the phase angle of the output signal. Many different repetitive oscillatory signal, including, of course, the disclosed sinusoidal output, can be utilized herein.

Squaring amplifier 14 has a positive and a negative trigger level and will produce a hysteretic, two state output similar to the output of a Schmitt Trigger. The effect of the system discussed so far is that the range block will initiate the running of the gated oscillator 12. Oscillator 12 will run for a period of time slightly exceeding the time coincident with the occurrence of the trailing edge of the range block. At the end of the range block, the sampling monostable will trigger the sampling gate on and allow a sampled portion of the gated oscillator signal to pass to squaring amplifier 14. When this sampled portion approaches the above-mentioned trigger levels from a negative to a positive state or from a positive to a negative state, the output of the squaring amplifier will have a resultant triggered change of state. For each change of state of the squaring amplifier 14, the sampled voltage must cross one of the two trigger levels and with the crossing of a level, the amplifier will remain in a new state until the sampled input voltage reaches the opposite level of triggering. Although amplifier 14 need not be hysteretic, this action is beneficial in preventing jitter in sampling instant from affecting the quality of the speed measurement.

The output of squaring amplifier 14 becomes a square wave having a frequency proportional to the rate of change of the range block times the frequency of the gated oscillator. Accordingly, the square wave low frequency output wave form from squaring amplifier 19 is proportional to the rate at which the range block moves across a given phase of the gated oscillator output wave form. This frequency is directly proportional to the speed of the airborne transmitter relative to the ground station.

The square wave produced from squaring amplifier 14 is transmitted directly to monostable 15 where a single voltage block is produced for each cycle of squaring amplifier output. The DC average of this voltage block is an accurate proportional representation of the frequency of the squaring amplifier output and accordingly an easily measured function of relative ground speed of the aircraft. Low pass filter 16 further extracts this DC component and transmits same to follower amplifier 17. This DC voltage applied to volt meter 18 is a direct and extremely accurate representation of the ground speed of the aircraft relative to the ground transmitter. Meter 18 is essentially a volt meter that is calibrated in speed increments between 0 and 2 volts.

Figure 4:
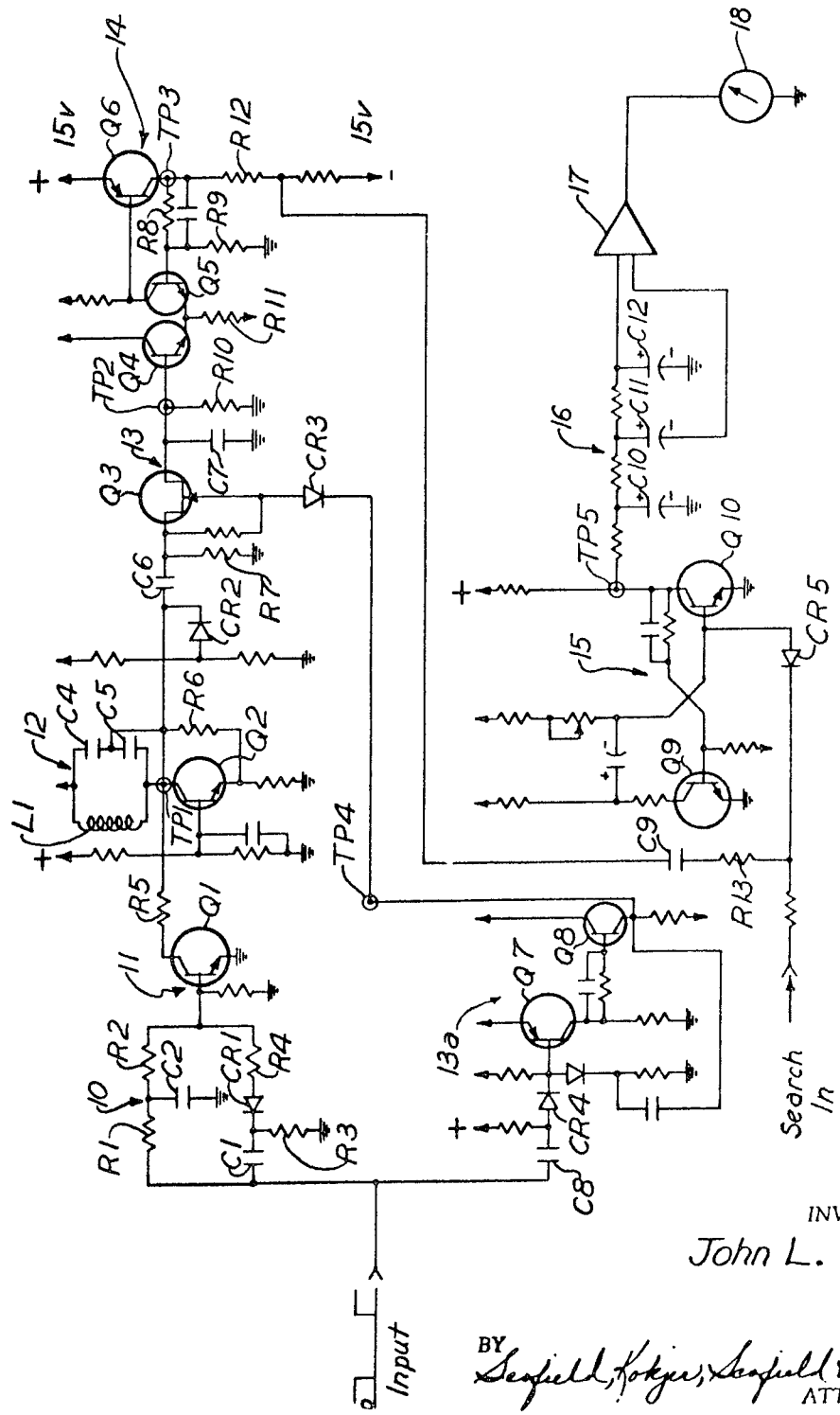
FIG. 4 is a schematic circuit diagram of the ground speed measuring and indicating circuit shown in FIG. 1.

Turning now more specifically to FIG. 4, the above-mentioned delay circuit 10 comprises the combination of capacitor C1, diode CR1, resistor R4, in parallel combination with resistor R1 and resistor R2. Capacitor C2 is connected to ground between resistors R1 and R2 and resistor R3 is connected to ground between capacitor C1 and diode CR1. The range block signal is applied directly to the input terminal designated as INPUT and represents the duration between transmission and reception over a DME ranging cycle. This range block signal is applied directly to the initial elements of delay network 10 which includes capacitor C1 and resistor R1. The negative going leading edge of the range block causes current to flow through capacitor C1, diode CR1 and resistor R4 to gate 11. Gate 11 is mainly comprised of transistor Q1 and is so biased that the negative going excursion of the range block biases the base of Q1 to immediately cut it off. Transistor Q1, when off, initiates the oscillatory output of oscillator 12 as will be seen infra.

For the first few microseconds, there will be no appreciable current through resistor R1 and R2 of delay circuit 10 due to the storage effect of capacitor C2. As a result, when transistor Q1 turns off, this circuit path has no appreciable effect on the overall operation of the speed circuit during this portion of the operation. However, when transistor Q1 (gate 11) is turned back on at the end of the range block (the positive going trailing edge), the effect of the network which includes resistors R1 and R2, and capacitor C2 is to delay the turn on of the transistor Q1 to give sampling gate 13 time to act on the gated oscillator signal from oscillator 12 without distortion of the wave form by a gating action of transistor Q1. Accordingly, the delay circuit operates to delay only the turning on of transistor Q1 (gate 11) and to allow an immediate gating off of the same transistor in accordance with the occurrence of the negative going leading edge of the range block.

Gated oscillator 12 (a Colpitts oscillator) includes transistor Q2 and has a resonant frequency of about 500 kc. When transistor Q1 of gate 11 is off, transistor Q2 of gated oscillator 12 will oscillate at the frequency of 500 kc. indefinitely. This frequency is determined by the resonant combination of inductor L1 and capacitors C4 and C5. Feedback resistor R6, which connects the emitter of transistor Q2 between the serial connection of capacitors C4 and C5, is selected so that when the oscillator circuit is activated and unloaded by the gating transistor Q1, the oscillator will have a loop gain of slightly more than one (1) and will run indefinitely as mentioned supra.

When gating transistor Q1 is on, as a result of the time coincidence of the trailing edge of the range block, resistor R5 is essentially shunted across inductor L1 of the above-mentioned tank circuit. The combined effect of the shunting of resistor R5 across the tank circuit is to reduce the loop gain of the oscillator so that the oscillator will not continue to oscillate. During this time, a current will flow through inductor L1, resistor R5, and through the on transistor Q1 to ground. This DC current represents stored energy in inductor L1. When gating transistor Q1 is turned off, this current no longer flows into resistor R5, but now must flow into capacitor C5, giving the tank circuit an initial kick to start oscillation. This feature insures a phase coherent oscillator output with respect to the leading edge of the range block. Once triggered or pulsed, the tank circuit of oscillator 12 will remain oscillating due to the action of transistor Q2 which returns the energy to the tank circuit at a rate equal to its dissipating rate.

Diode CR2, which is connected across the output of oscillator 12, serves as an amplitude limiter and maintains constant amplitude out of oscillator 12 with variations of component values that may be due to temperature. By limiting the amplitude of the oscillator with diode CR2 rather than by some less definite limiting mechanism, ordinarily associated with transistor Q2, a constant amplitude gated signal is presented through capacitor C6 to field effect transistor Q3 which is utilized in sampling gate 13.

The field effect transistor Q3 acts essentially as a switch with the impedance between source and drain remaining very high as long as the transistor is back biased with respect to the source. This back bias condition is maintained by a negative voltage from the output Q8 (from sampling monostable 13a) through diode CR3. At the sampling instant (the occurrence of positive going trailing edge of range block) the collector of transistor Q8 will become positive, reverse biasing diode CR3 and allowing the gate of field effect transistor Q3 to become equal to the source voltage. Under this condition, the field effect transistor will be on and will conduct, across to grounded capacitor C7, any voltage which is present at the junction of resistor R7 and capacitor C6.

The sampling monostable 13a is a high speed monostable of very short duration, typically having an on time from 0.2 to 0.5 microseconds in duration. The positive going trailing edge of the range block will be transmitted from the input, common with the delay circuit 10, through capacitor C8 and diode CR4 to the input of the monostable 13a comprised of transistors Q7 and Q8. This monostable is turned on in a conventional manner and during this short duration of on triggering, the voltage at test point TP4 will go from a −15 volts to a +15 volts and remain at this positive voltage condition for the monostable time duration. After the cessation of the time duration, the voltage at test point TP4 will return to a −15 volts potential. It is the positive 15 volt monostable output that biases field effect transistor Q3 to drive sampling gate 13 on and allows a sampled portion of the gated oscillator signal to pass on to test point TP2.

Squaring amplifier 14 monitors the sampled voltage appearing at test point TP2. This amplifier has a positive feedback network and is essentially comprised of transistors Q4, Q5 and Q6. The effect of the positive feedback network which is applied through resistors R8 and R9 is to produce a hysteresis effect in the amplifier's output. A hysteretic output signal, similar to that produced by a Schmitt trigger, causes the amplifier output to remain at either a full negative value or a full positive value until triggered to the opposite state.

Assuming that the output of squaring amplifier 14 is presently in a negative state, test point TP3 will be at a −15 volt potential with transistors Q5 and Q6 turned completely off. Due to the voltage divider effect of resistors R8 and R9, the base of transistor Q5 will be at an approximately −2 volt potential. The base of transistor Q4, however, will essentially be at ground potential due to the presence of resistor R10. In this sequence of events, transistor Q4 will be on, maintaining the voltage at its emitter and resistor R11 at a slight negative value, causing transistor Q5 to remain off.

In order for amplifier 14 to change states, test point TP2 must be drawn to a negative enough value so that transistor Q5 will be forced to turn on. This means that the sampled amplitude of the oscillatory output of oscillator 12 must reach an approximate −2 volt value. When this value is reached, transistor Q5 will be forced to conduct a small amount of current and will turn transistor Q6 on, drawing test point TP3 up toward positive supply potential, further turning transistor Q5 on. The amplifier circuit will continue to transfer states to a high positive output and will remain so until the sampled amplitude reaches the preselected positive value. As a result, the hysteretic amplifier (squaring amplifier 14) has two trigger levels, one at a +2 volt level and the other at a −2 volt level. For a change of state in the output of squaring amplifier 14, the sampled voltage must cross one of the two trigger levels and, when crossed, the amplifier will remain in the new state until a new sampled input reaches the opposite level of triggering. The output of this amplifier then becomes a square wave having a frequency which is proportional to the rate of change of the range block time interval.

Figure 3:
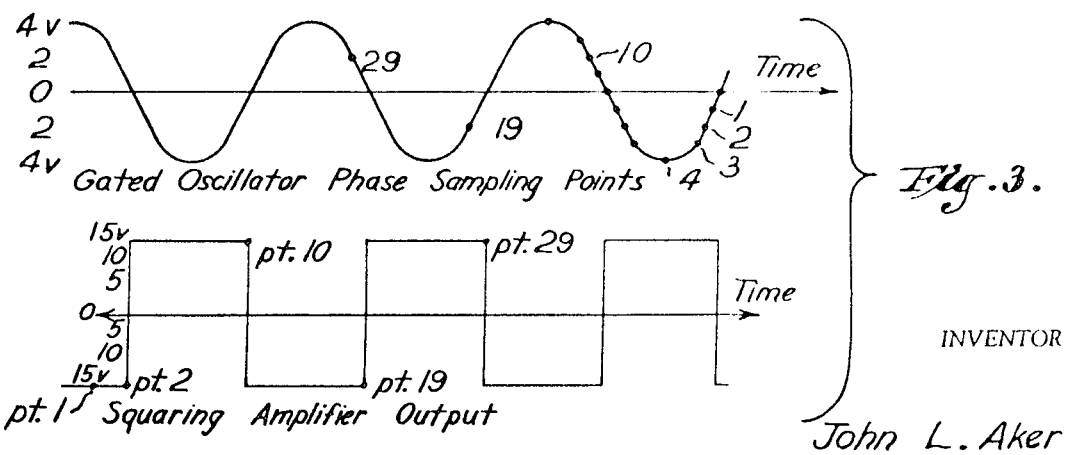
FIG. 3 is a wave form analysis of the gated oscillator phase sampling points and comparing their relationship to the output produced by the squaring amplifier.

As seen in FIG. 3, the numbers 1 through 29 represent sampled points on the oscillatory output of oscillator 12. This oscillator output is essentially sinusoidal and the occurrence of the trailing edge of the range block has occurred at points 1−29, thereby transmitting the respective value of phase voltage through sampling gate 13 to squaring amplifier 14. At point 1, the output of the squaring amplifier 14 is still a negative value as the −2 volt trigger level has not yet been reached. Point 2 would represent the second point sampled on the gated oscillator output and would indicate that the aircraft is travelling inbound to the ground station so that the duration of the range block is slowly decreasing. When the −2 volt phase is reached, the squaring amplifier is appropriately triggered to immediately cause the negative 15 volt output to change to the positive 15 volt level. As the aircraft continues inbound, and the sampling points run from 2 through 9, no change is effected on squaring amplifier 14. As soon as sampling point 10 is reached, the aircraft has travelled sufficiently inbound to result in a time duration of the range block which would produce a positive 2 volt level at that sampled phase of the oscillator output from oscillator 12. At this phase angle, the 2 volt level is again reached to trigger squaring amplifier 14, thereby abruptly returning the output of squaring amplifier 14 from a positive 15 volts to a negative 15 volts.

Figure 2:
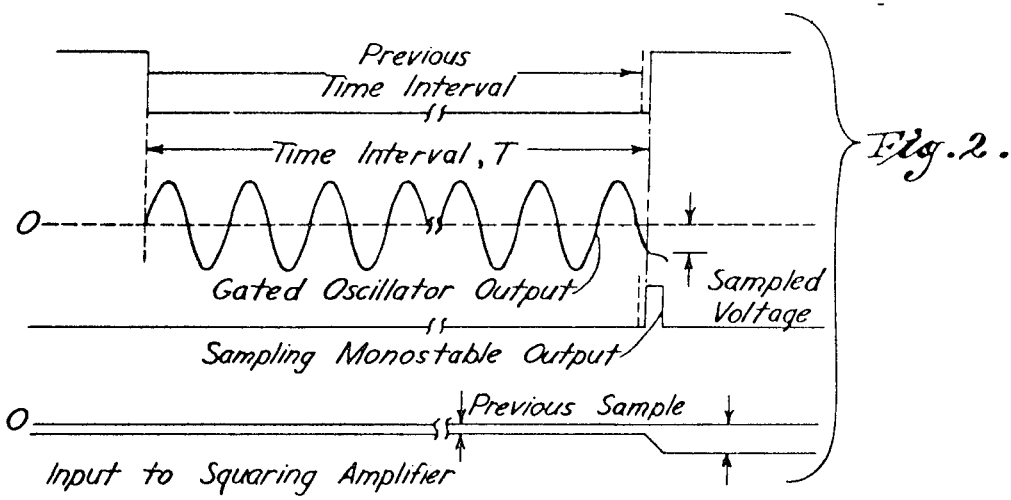
FIG. 2 is a wave form analysis of the relationship between the range block, gated oscillator output and the input to the squaring amplifier.

The sampling of the phase of the oscillatory signal output from oscillator 12 is further exemplified in FIG. 2. There, the "Previous Time Interval" of the range block is shown as having a lesser time duration than the presently considered "Time Interval, T." This indicates that the aircraft is moving outbound from the ground beacon receiver/transmitter. As indicated by the amplitude (magnitude) of the voltage level depicted as "Previous Sample," the sampling monostable output (shown as a short duration positive pulse) causes gate 13 to sample the oscillator output at a phase angle coincident with the time occurrence of the vertical broken line seen on the monostable output plot. The voltage level at this phase angle is a negative value. The voltage level sampled by the "Time Interval, T" is still a negative value, however, having a larger negative amplitude, due to the fact that the increased time duration causes sampling of the oscillator output to occur when the output had travelled in a sinusoidal manner to a more negative level than the voltage level of the "Previous Sample."

From this example, it should be noted that the sampling monostable output moves on its own time scale as directed by the duration of the "Time Interval, T" and therefore sampling of the gated oscillator output is accomplished in a similar manner whether the aircraft is inbound or outbound relative to the ground station.

As the sampling continues along the gated oscillator output, the output of the squaring amplifier approximates a square wave having a low frequency which might be termed as a "crawl" frequency. This can further be explained by considering that the range block "crawls" across the phase of the wave form of the gated oscillator. The squaring amplifier then produces a square wave output whose rate is proportional to the "crawl" rate and wherein the voltage transitions occur at repeated multiples of the same phase angle of the gated oscillator wave form.

The low frequency square wave output of squaring amplifier 14 is taken from test point TP3 through resistor R12, capacitor C9, resistor R13, diode CR5 to the base of transistor Q10. Transistors Q9 and Q10 form a monostable or block generator 15. This block generator is triggered on by each negative going excursion of the output of squaring amplifier 14 to produce a positive voltage block at test point TP5. Thus, as seen in FIG. 3, a positive output block will appear at test point TP5 for each output cycle of squaring amplifier 14. Assume that each cycle in the output from the squaring amplifier 14 represents two-tenths of a nautical mile distance change due to the fact that gated oscillator 12 is running at approximately 404 kc. As a result, it will follow that the monostable voltage block will appear at TP5 every time the aircraft negotiates a two-tenths of a mile of distance change relative the ground station. The DC average of this monostable voltage block is directly proportional to the rate of change of the input range block duration with respect to time.

For measuring and indicating purposes, the DC component of the output appearing at test point TP5 is extracted by low pass filter 16 which includes capacitors C10, C11 and C12. This low pass filter has a cutoff frequency of approximately five one-hundredths of a cycle per second. The filtered DC component is then passed to a high impedance unity gain amplifier 17 and finally to the speed meter or volt meter 18. Meter 18 will give an accurate indication of relative ground speed without having to indicate same in the presence of unwanted noise and may therefore be a volt meter having a scale from 0 to 250 knots, depending upon what the operational characteristics of the aircraft may be. A full scale reading may be divided between 0 and 2.5 volts, thusly allocating an easily measurable amount of scale increment.

The monostable 15 has a second input denoted as the "-search in" line. The purpose of this input is to disable the operation of monostable 15 while the DME unit operates in the searching mode. A high positive voltage will appear on the search in line when the DME unit is in a search mode and a ground potential will exist thereon while the unit is tracking. For example, this positive voltage may be transmitted from the PRF switch on the range board of my application mentioned supra. This positive voltage will tend to reverse bias diode CR5, thusly preventing the negative going edge of the output from squaring amplifier 14 from triggering transistor Q10. Accordingly, no initial speed velocity signal can be delivered to test point TP5 while the DME unit is in a search mode of operation, thusly allowing low pass filter 16, which extracts the DC component of the voltage at test point TP5, to always begin with a zero voltage when the DME unit goes into the track mode.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A method for determining the rate of change of a recurring time interval, said method comprising the steps of
   using a voltage representation of changeable duration to represent the start and the end of said time interval,
   correlating the oscillatory output of an oscillator with the start of the time interval,
   sampling the voltage of the oscillator output signal at the end of said time interval,
   forming a second signal in response to levels of sampled voltages of said oscillator output, and
   measuring the frequency of said second signal to determine the rate of change of said time interval.

2. A method for determining the rate of change of a recurring time interval, said method comprising the steps of
   using a pulse of changeable duration to represent the start and the end of said time interval,
   correlating the oscillatory output of an oscillator with the start of the time interval,
   sampling the voltage of the oscillator output signal at the end of said time interval,
   forming a second signal in response to levels of sampled voltages of said oscillator output, and
   measuring the frequency of said second signal to determine the rate of change of said time interval.

3. The invention as in claim 2 wherein the correlating step is accomplished by gating an oscillator on with that portion of said pulse representing the start of said time interval, said oscillator thereby producing an oscillatory output signal.

4. The invention as in claim 3 wherein the leading edge of said pulse represents the start of said time interval and the trailing edge of said pulse represents the end of said time interval.

5. The invention as in claim 4 wherein said oscillator is phase coherent and is always gated on in consistent phase relationship with the start of the time interval.

6. The invention as in claim 5 wherein said oscillator output signal is sampled by gating on a sampling gate due to the presence of the trailing edge of the pulse representing the end of the time interval, said sampling gate operable to pass the sampled voltage level of the oscillator output at the instant in time that said end of the time interval occurred, thereby initiating the forming of said second signal in response to preselected phases of said oscillator voltage.

7. The invention as in claim 4 wherein said pulse is a function of the distance from an airborne transmitter/receiver to a ground station receiver/transmitter.

8. The invention as in claim 7 wherein said oscillator is phase coherent and is always gated on in consistent phase relationship with the start of the time interval.

9. The invention as in claim 7 wherein said oscillator output signal is sampled by gating on a sampling gate due to the presence of the trailing edge of the pulse representing the end of the time interval, said sampling gate operable to pass the sampled voltage level of the oscillator output at the instant in time that said end of the time interval occurred, thereby initiating the forming of said second signal in response to preselected phases of said oscillator voltage.

10. In distance/ground speed measuring equipment capable of producing a pulse whose time duration from leading edge to trailing edge is a function of the distance from the airborne receiver to a ground transmitter, the improvement comprising means for producing an output signal having a periodic wave form, means for synchronizing said wave form with the leading edge of said pulse, means for producing a second output signal in response to the level of the wave form at the time of occurrence of said trailing edge of said pulse, and means operable as a function of the frequency of said second output signal for indicating the ground speed of said airborne receiver relative to said ground transmitter.

11. The invention as in claim 10 wherein said first signal producing means and said synchronizing means include an oscillator, said oscillator operable to produce said first output signal, and means for gating on said oscillator due to the time occurrence of said leading edge of said pulse, said oscillator when gated on thereby producing said output signal having said periodic wave form.

12. The invention as in claim 10 wherein said means for producing said second output signal includes a sampling gate receiving said first output signal, and means for turning on said sampling gate due to the time occurrence of said trailing edge of said pulse, said sampling gate thereby passing voltage levels of said first signal at its turn on instant.

13. The invention as in claim 10 including means for measuring the frequency of said second output signal, said indicating means operable to indicate said frequency as the relative ground speed of said airborne receiver.

14. In distance/ground speed measuring equipment capable of producing a pulse whose time duration from leading edge to trailing edge is a function of the distance from an airborne receiver to a ground transmitter, the improvement comprising an oscillator, means for gating on said oscillator due to the time occurrence of said leading edge of said pulse, said oscillator when gated on having a running oscillatory output, a sampling gate connected to the output of said oscillator, means for turning on said sampling gate due to the time occurrence of said trailing edge of said pulse, said sampling gate thereby operable to pass voltage levels of said oscillator output at its turn on instant, means for producing an output signal in response to levels of said voltage pass through said gate, means for measuring the frequency of said last named output signal, and means for indicating said measured frequency in terms of ground speed of said airborne receiver relative to said ground transmitter.

15. The invention as in claim 14 wherein said oscillator is a phase coherent gated oscillator that is always gated on at the same phase angle.

16. The invention as in claim 15 wherein said trailing edge of said pulse is operable to turn said gated oscillator off, and including a means for delaying said time occurrence of said trailing edge to eliminate oscillator wave distortion at said sampling instant.

17. The invention as in claim 14 wherein said last named output signal producing means includes a squaring amplifier that is responsive to preselected levels of said voltage passed through said gate, said amplifier having an output change of state when said preselected voltage levels are applied thereto.

18. The invention as in claim 17 wherein said output from said squaring amplifier is used to trigger a monostable, and a filter connected to said monostable, said filter operable to extract a voltage component whose value is a function of the frequency of said squaring amplifier output.

19. The invention as in claim 18 wherein said distance measuring equipment operates in either a search mode or a track mode and wherein said improvement includes a means for disabling said monostable during said search mode of operation.